United States Patent [19]

Lewis et al.

[11] 4,191,537

[45] * Mar. 4, 1980

[54] FUEL COMPOSITIONS OF POLY(OXYALKYLENE) AMINOCARBAMATE

[75] Inventors: Robert A. Lewis, Berkeley; Lewis R. Honnen, Petaluma, both of Calif.

[73] Assignee: Chevron Research Company, San Francisco, Calif.

[*] Notice: The portion of the term of this patent subsequent to Jul. 10, 1996, has been disclaimed.

[21] Appl. No.: 917,149

[22] Filed: Jun. 19, 1978

Related U.S. Application Data

[63] Continuation-in-part of Ser. No. 887,703, Mar. 17, 1978, abandoned, which is a continuation-in-part of Ser. No. 801,441, May 27, 1977, which is a continuation-in-part of Ser. No. 730,495, Oct. 7, 1976, abandoned, which is a continuation-in-part of Ser. No. 700,922, Jun. 29, 1976, abandoned, which is a continuation-in-part of Ser. No. 698,243, Jun. 21, 1976, abandoned.

[51] Int. Cl.² .................... C10L 1/22; C07C 69/24
[52] U.S. Cl. ................................. 44/71; 44/58; 44/63; 260/239 A; 260/239 BC; 544/398; 544/402; 548/320; 560/158; 560/159

[58] Field of Search .............. 44/58, 63, 71; 560/158, 560/159; 260/239 AL, 239 BC; 544/398, 402; 548/320

[56] References Cited

U.S. PATENT DOCUMENTS

| | | | |
|---|---|---|---|
| 2,991,162 | 7/1961 | Malec | 44/71 X |
| 3,359,303 | 12/1967 | Coker et al. | 560/159 |
| 3,438,757 | 4/1969 | Honnen et al. | 44/58 |
| 3,454,625 | 7/1969 | Eiseman, Jr. et al. | 560/159 |
| 3,565,592 | 2/1971 | Mehmedbasich | 44/71 X |
| 3,652,240 | 3/1972 | Dorn et al. | 44/71 X |
| 3,658,882 | 4/1972 | Eiseman, Jr. | 260/463 X |
| 3,671,511 | 6/1972 | Honnen et al. | 44/58 X |
| 3,786,081 | 1/1974 | Oppenlaender et al. | 560/158 X |
| 3,813,341 | 5/1974 | Elliott et al. | 560/158 X |
| 3,960,515 | 6/1976 | Honnen | 44/63 X |

*Primary Examiner*—Thomas A. Waltz
*Attorney, Agent, or Firm*—D. A. Newell; S. R. LaPaglia

[57] ABSTRACT

Fuel compositions for internal combustion engines are provided which contain deposit control additives which maintain cleanliness of intake systems without contributing to combustion chamber deposits. The additives are poly(oxyalkylene) aminocarbamates comprising a hydrocarbyl-terminated poly(oxyalkylene) moiety composed of 2–5 carbon oxyalkylene units.

41 Claims, No Drawings

FUEL COMPOSITIONS OF POLY(OXYALKYLENE) AMINOCARBAMATE

CROSS REFERENCE TO RELATED APPLICATIONS

This is a continuation-in-part of U.S. application Ser. No. 887,703, filed Mar. 17, 1978, now abandoned, which in turn is a continuation-in-part of U.S. application Ser. No. 801,441, filed May 27, 1977, which in turn is a continuation-in-part of application Ser. No. 730,495, filed Oct. 7, 1976, now abandoned, which in turn is a continuation-in-part of Ser. No. 700,922, filed June 29, 1976, now abandoned, which in turn is a continuation-in-part of Ser. No. 698,243, filed June 21, 1976, now abandoned.

BACKGROUND OF THE INVENTION

1. Field of the Invention

In recent years, numerous fuel detergents or "deposit control" additives have been developed. These materials when added to hydrocarbon fuels employed in internal combustion engines effectively reduce deposit formation which ordinarily occurs in carburetor ports, throttle bodies, venturies, intake ports and intake valves. The reduction of these deposit levels has resulted in increased engine efficiency and a reduction in the level of hydrocarbon and carbon monoxide emissions.

A complicating factor has, however, recently arisen. With the advent of automobile engines that require the use of non-leaded gasolines (to prevent disablement of catalytic converters used to reduce emissions), it has been found difficult to provide gasoline of high enough octane to prevent knocking and the concomitant damage which it causes. The cause of the problem is the degree of octane requirement increase, herein called "ORI", which is due to deposits formed in the combustion chamber while the engine is operating on commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period will reach equilibrium. This is apparently caused by an amount of deposits in the combustion chamber. Equilibrium is typically reached after 5000 to 15,000 miles of automobile operation.

The octane requirement increase measured in particular engines used with commercial gasolines, will vary at equilibrium from 5 or 6 octane units to as high as 12 or 15 units, depending upon the gasoline compositions, engine design and type of operation. The seriousness of the problem is thus apparent. A typical 1975 or 1976 automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

It is believed, however, by many experts, that the ORI problem, while present with leaded gasolines, is much more serious with unleaded fuel because of the different nature of the deposits formed with the respective fuels, the size of increase, and because of the lesser availability of high-octane non-leaded fuels. This problem is compounded by the fact that the most common means of enhancing the octane of unleaded gasoline, increasing its aromatic content, also appears to increase the eventual octane requirement of the engine. Furthermore, it was recently discovered that some of the presently used nitrogen-containing deposit control additives with mineral oil or polymer carriers appear to contribute significantly to the ORI of engines operated on unleaded fuel.

It is, therefore, highly desirable to provide fuel compositions which contain deposit control additives which effectively control deposits in intake systems (carburetor, valves, etc.) of engines operated with fuels containing them, but do not contribute to the combustion chamber deposits which cause increased octane requirements.

DESCRIPTION OF THE PRIOR ART

U.S. Pat. No. 3,359,303 discloses reaction products of polyalkyleneoxy alkyl 1-aziridine carboxylates with polyamines. These materials are disclosed as being curing agents (crosslinking agents) for epoxy resins. The alkyleneoxy chains contain a maximum of 20 alkyleneoxy units. U.S. Pat. No. 3,658,882 discloses certain aryl carbamates and quaternary derivatives thereof useful as antistatic agents. U.S. Pat. No. 3,786,081 describes compounds useful as crude oil demulsifiers which are bis-poly(oxyalkylene) derivatives of diisocyanates. U.S. Pat. No. 2,842,433 proposes a polyglycol dicarbamate ester of monoamine as an additive which reduces the deposit-forming tendencies of fuels.

SUMMARY OF THE INVENTION

A fuel composition is provided which contains a deposit control additive which aids the composition in maintaining cleanliness of engine intake systems and does not contribute to combustion chamber deposits. The fuel composition comprises a major amount of hydrocarbons boiling in the gasoline range, and from about 30 to about 2,000 ppm of a hydrocarbylpoly(oxyalkylene) aminocarbamate of molecular weight from about 600 to about 10,000 and having at least one basic nitrogen atom; wherein said poly(oxyalkylene) moiety is composed of oxyalkylene units selected from 2 to 5 carbon oxyalkylene units and containing at least sufficient branched chain oxyalkylene units to render said carbamate soluble in said fuel composition; and said hydrocarbyl group contains from 1 to about 30 carbon atoms.

DETAILED DESCRIPTION OF THE INVENTION

The poly(oxyalkylene) aminocarbamate of the present invention consists of an amine moiety and a poly(oxyalkylene) moiety comprising at least one hydrocarbyl-terminated poly(oxyalkylene) polymer bonded through a carbamate linkage, i.e.,

The amine component of the carbamate and the poly(oxyalkylene) component of the carbamate are selected to provide solubility in the fuel composition and deposit control activity without octane requirement increase.

Amine Component

The amine moiety of the hydrocarbyl-terminated poly(oxyalkylene) aminocarbamate is preferably derived from a polyamine having from 2 to about 12 amine nitrogen atoms and from 2 to about 40 carbon atoms. The polyamine is preferably reacted with a hydrocarbylpoly(oxyalkylene) chloroformate to produce the hydrocarbylpoly(oxyalkylene) aminocarbamate fuel additive finding use within the scope of the present invention. The chloroformate is itself derived from hydrocarbylpoly(oxyalkylene) alcohol by reaction with phosgene. The polyamine, encompassing diamines, provides the product poly(oxyalkylene) aminocarbamate with, on the average, at least about one basic nitrogen atom per carbamate molecule, i.e., a nitrogen atom titratable by a strong acid. The polyamine preferably has a carbon-to-nitrogen ratio of from about 1:1 to about 10:1.

The polyamine may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms. At least one of the substituents on one of the basic nitrogen atoms of the polyamine is hydrogen, e.g., at least one of the basic nitrogen atoms of the polyamine is a primary or secondary amino nitrogen.

Hydrocarbyl, as used in describing all the components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxy-isopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ethoxyethoxy)ethoxy)ethyl, 3,6,9,12-tetraoxatetradecyl, 2-(2-ethoxyethoxy)hexyl, etc. The acyl groups of the aforementioned (C) substituents are such as propionyl, acetyl, etc. The more preferred substitutents are hydrogen, $C_1-C_6$ alkyls and $C_1-C_6$ hydroxyalkyls.

In a substituted polyamine the substituents are found at any atom capable of receiving them. The substituted atoms, e.g., substituted nitrogen atoms, are generally geometrically inequivalent, and consequently the substituted amines finding use in the present invention can be mixtures of mono- and polysubstituted polyamines with substituent groups situated at equivalent and/or inequivalent atoms.

The more preferred polyamine finding use within the scope of the present invention is a polyalkylene polyamine, including alkylene diamine, and including substituted polyamines, e.g., alkyl and hydroxyalkyl-substituted polyalkylene polyamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethyl-propylene, trimethylene, 1,3,2-hydroxypropylene, etc. Examples of such polyamines include ethylene diamine, diethylene triamine, di(trimethylene)triamine, dipropylene triamine, triethylene tetramine, tripropylene tetramine, tetraethylene pentamine, and pentaethylene hexamine. Such amines encompass isomers such as branched-chain polyamines and the previously mentioned substituted polyamines, including hydroxy- and hydrocarbyl-substituted polyamines. Among the polyalkylene polyamines, those containing 2-12 amine nitrogen atoms and 2-24 carbon atoms are especially preferred, and the $C_2-C_3$ alkylene polyamines are most preferred, in particular, the lower polyalkylene polyamines, e.g., ethylene diamine, dipropylene triamine, etc.

The amine component of the poly(oxyalkylene) aminocarbamate also may be derived from heterocyclic polyamines, heterocyclic substituted amines and substituted heterocyclic compounds, wherein the heterocycle comprises one or more 5–6 membered rings containing oxygen and/or nitrogen. Such heterocycles may be saturated or unsaturated and substituted with groups selected from the aforementioned (A), (B), (C) and (D). The heterocycles are exemplified by piperazines, such as 2-methylpiperazine, N-(2-hydroxyethyl)piperazine, 1,2-bis-(N-piperazinyl)ethane, and N,N'-bis(N-piperazinyl)piperazine, 2-methylimidazoline, 3-aminopiperidine, 2-aminopyridine, 2-(3-aminoethyl)-3-pyrroline, 3-aminopyrrolidine, N-(3-aminopropyl)morpholine, etc. Among the heterocyclic compounds, the piperazines are preferred.

Typical polyamines that can be used to form the compounds of this invention by reaction with a poly(oxyalkylene)chloroformate include the following: ethylene diamine, 1,2-propylene diamine, 1,3-propylene diamine, diethylene triamine, triethylene tetramine, hexamethylene diamine, tetraethylene pentamine, dimethylaminopropylene diamine, N-(beta-aminoethyl)piperazine, N-(beta-aminoethyl)piperidine, 3-amino-N-ethylpiperidine, N-(beta-aminoethyl)morpholine, N,N'-di(beta-aminoethyl)piperazine, N,N'-di(beta-aminoethyl)imidazolidone-2, N-(beta-cyanoethyl)ethane-1,2-diamine, 1-amino-3,6,9-triazaoctadecane, 1-amino-3,6-diaza-9-oxadecane, N-(beta-aminoethyl)diethanolamine, N'-acetyl-N'-methyl-N-(beta-aminoethyl)ethane-1,2-diamine, N-acetonyl-1,2-propanediamine, N-(beta-nitroethyl)-1,3-propane diamine, 1,3-dimethyl-5-(beta-aminoethyl)hexahydrotriazine, N-(beta-aminoethyl)-hexahydrotriazine, 5-(beta-aminoethyl)-1,3,5-dioxazine, 2-(2-aminoethylamino)-ethanol, 2-[2-(2-aminoethylamino)ethylamino]-ethanol.

The amine component of the poly(oxyalkylene) aminocarbamate may also be derived from an amine-containing compound which is capable of reacting with a hydrocarbylpoly(oxyalkylene) alcohol to produce a hydrocarbylpoly(oxyalkylene) aminocarbamate having at least one basic nitrogen atom. For example, a substituted aminoisocyanate, such as $(R)_2NCH_2CH_2NCO$, wherein R is, for example, a hydrocarbyl group, reacts with the alcohol to produce the aminocarbamate additive finding use within the scope of the present invention. Typical aminoisocyanates that may be used to form the fuel additive compounds of this invention by reaction with a hydrocarbylpoly(oxyalkylene) alcohol include the following: N,N-(dimethyl)aminoisocyanatoethane, generally, N,N-(dihydrocarbyl)aminoisocyanatoalkane, more generally, N-(perhydrocarbyl)isocyanatopolyalkylene polyamine, N,N-(dimethyl)aminoisocyanatobenzene, etc.

In many instances the amine used as a reactant in the production of the carbamate of the present invention is not a single compound but a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be mainly tetraethylene pentamine and the empirical formula of the total amine composition will closely approximate that of tetraethylene pentamine. Finally, in preparing the compounds of this invention, where the various nitrogen atoms of the polyamine are not geometrically equivalent, several substitutional isomers are possible and are encompassed within the final product. Methods of preparation of amines, isocyanates and their reactions are detailed in Sidgewick's "The Organic Chemistry of Nitrogen," Clarendon Press, Oxford, 1966; Noller's "Chemistry of Organic Compounds," Saunders, Philadelphia, 2nd Ed., 1957; and Kirk-Othmer's "Encyclopedia of Chemical Technology," 2nd Ed., especially Volume 2, pp. 99–116.

Poly(oxyalkylene) Component

The hydrocarbyl-terminated poly(oxyalkylene) polymers which are utilized in preparing the carbamates of the present invention are monohydroxy compounds, i.e., alcohols, often termed monohydroxy polyethers, or polyalkylene glycol monohydrocarbylethers, or "capped" poly(oxyalkylene) glycols and are to be distinguished from the poly(oxyalkylene) glycols (diols), or polyols, which are not hydrocarbyl-terminated, i.e., not capped. The hydrocarbyl-terminated poly(oxyalkylene) alcohols are produced by the addition of lower alkylene oxides, such as oxirane, ethylene oxide, propylene oxide, the butylene oxides, or the pentylene oxides to the hydroxy compound ROH under polymerization conditions, wherein R is the hydrocarbyl group which caps the poly(oxyalkylene) chain. Methods of production and properties of these polymers are disclosed in U.S. Pat. Nos. 2,841,479 and 2,782,240, and the aforementioned Kirk-Othmer's "Encyclopedia of Chemical Technology," Volume 19, p. 507. In the polymerization reaction a single type of alkylene oxide may be employed, e.g., propylene oxide, in which case the product is a homopolymer, e.g., a poly(oxypropylene) propanol. However, copolymers are equally satisfactory and random copolymers are readily prepared by contacting the hydroxyl-containing compound with a mixture of alkylene oxides, such as a mixture of propylene and butylene oxides. Block copolymers of oxyalkylene units also provide satisfactory poly(oxyalkylene) polymers for the practice of the present invention. Random polymers are more easily prepared when the reactivities of the oxides are relatively equal. In certain cases, when ethylene oxide is copolymerized with other oxides, the higher reaction rate of ethylene oxide makes the preparation of random copolymers difficult. In either case, block copolymers can be prepared. Block copolymers are prepared by contacting the hydroxyl-containing compound with first one alkylene oxide, then the others in any order, or repetitively, under polymerization conditions. A particular block copolymer is represented by a polymer prepared by polymerizing propylene oxide on a suitable monohydroxy compound to form a poly(oxypropylene) alcohol and then polymerizing butylene oxide on the poly(oxypropylene) alcohol.

In general, the poly(oxyalkylene) polymers are mixtures of compounds that differ in polymer chain length. However, their properties closely approximate those of the polymer represented by the average composition and molecular weight.

The hydrocarbylpoly(oxyalkylene) moiety of the carbamate consists of one or more hydrocarbyl-terminated poly(oxyalkylene) polymers composed of oxyalkylene units containing from 2 to about 5 carbon atoms. The polymers are bound to the aminocarbamate via the oxygen atom of carbamate linkages, and the poly(oxyalkylene) moiety consists of at least one such poly(oxyalkylene) polymer. The hydrocarbyl group contains from 1 to about 30 carbon atoms, preferably from 2 to about 20 carbon atoms. Preferably the oxyalkylene units contain from 3 to 4 carbon atoms and the molecular weight of the hydrocarbyl poly(oxyalkylene) moiety is from about 500 to about 10,000, more preferably from about 500 to about 5,000. Each poly(oxyalkylene) polymer contains at least about 5 oxyalkylene units, preferably 8 to about 100 oxyalkylene units, more preferably about 10–100 units and most preferably 10 to about 25 such units. In general, the oxyalkylene units may be branched or unbranched. Preferably the poly(oxyalkylene) polymer chain contains at least some $C_3$–$C_5$ oxyalkylene units, more preferably branched $C_3$–$C_5$ oxyalkylene units are present in at least sufficient number to render the hydrocarbyl-terminated poly(oxyalkylene) aminocarbamate soluble in the fuel composition of the present invention. This solubility condition is satisfied if the carbamate is soluble in hydrocarbons boiling in the gasoline range, at least to the extent of about 30–2,000 ppm by weight. A poly(oxyalkylene) polymer chain composed of branched three and/or four carbon oxyalkylene units in at least sufficient amount to effect solubility in the fuel composition is most preferred. The structures of the $C_3$–$C_5$ oxyalkylene units are any of the isomeric structures well known to the organic chemist, e.g., n-propylene, —$CH_2CH_2CH_2$—; isopropylene, —$C(CH_3)CH_2$—; n-butylene, —$CH_2CH_2CH_2CH_2$—; sec.-butylene, —$CH(CH_2CH_3)CH_2$—; tert.-butylene, —$C(CH_3)_2CH_2$—; disec.-butylene, —$CH(CH_3)CH(CH_3)$—; isobutylene, —$CH_2CH(CH_3)CH_2$—; etc. The preferred poly(oxyalkylene) compounds are composed, at least in part, of the branched oxyalkylene isomers, particularly oxy(isopropylene), and oxy(sec.-butylene) units which are obtained from 1,2-propylene oxide and from 1,2-butylene oxide, respectively.

The hydrocarbyl moiety (R—) which terminates the poly(oxyalkylene) chain contains from 1 to about 30 carbon atoms, preferably from 2 to about 20 carbon atoms, and is generally derived from the monohydroxy compound (ROH) which is the initial site of the alkylene oxide addition in the polymerization reaction. Such monohydroxy compounds are preferably aliphatic or aromatic alcohols of from 1 to about 30 carbon atoms, more preferably an alkanol or an alkylphenol, and most preferably an alkylphenol wherein the alkyl is a straight or branched chain of from 1 to about 24 carbon atoms. One such preferred alkyl group is obtained by polymerizing propylene to an average of 4 units and has the common name of propylene tetramer. The preferred material may be termed either an alkylphenylpoly(oxyalkylene) alcohol or a polyalkoxylated alkylphenol.

Hydrocarbylpoly(oxyalkylene) Aminocarbamate

Having described the amine component and the poly(oxyalkylene) component, the poly(oxyalkylene) aminocarbamate fuel additive of the present invention is obtained by linking these components together through a carbamate linkage, i.e.,

wherein the oxygen may be regarded as the terminal hydroxyl oxygen of the poly(oxyalkylene) alcohol component, and the carbonyl group, —C(O)—, is preferably provided by a coupling agent, e.g., phosgene. In the preferred method of preparation, the hydrocarbylpoly(oxyalkylene) alcohol is reacted with phosgene to produce a hydrocarbylpoly(oxyalkylene) chloroformate. The chloroformate is reacted with a polyamine. The carbamate linkages are formed as the poly(oxyalkylene) chains are bound to the nitrogen of the polyamine through the oxycarbonyl group (—O—C(O)—) of the chloroformate. Since there may be more than one nitrogen atom of the polyamine which is capable of reacting with the chloroformate, the hydrocarbylpoly(oxyalkylene) aminocarbamate contains at least one hydrocarbylpoly(oxyalkylene) polymer chain bonded through an oxycarbonyl group to a nitrogen atom of the polyamine, but the carbamate may contain from 1 to 2 or more such chains. It is preferred that the hydrocarbylpoly(oxyalkylene) aminocarbamate product contain, on the average, about 1 poly(oxyalkylene) chain per molecule (i.e., mono carbamate), although it is understood that this reaction route may lead to mixtures containing appreciable amounts of di- or higher poly(oxyalkylene) chain substitution on a polyamine containing several reactive nitrogen atoms (i.e., dicarbamate or higher degree of substitution). To avert di- or higher substitution on the polyamine, a large excess of polyamine may be contacted with the chloroformate. Alternatively, a monoisocyanato-substituted amine may be reacted directly with the poly(oxyalkylene) alcohol. The dicarbamate produced by the reaction of a polyamine with two molecules of hydrocarbylpoly(oxyalkylene) chloroformate is to be distinguished from the dicarbamate produced by the reaction of a poly(oxyalkylene) di(chloroformate) with two moles of the same polyamine. For purposes of distinction, the latter dicarbamate will be called the "bis(aminocarbamate)", and the former simply "dicarbamate". The bis(aminocarbamate), i.e., that derived from a poly(oxyalkylene) glycol, has been shown to be deleterious in fuel compositions, while the dicarbamate, i.e., that produced from the hydrocarbyl-terminated poly(oxyalkylene) alcohol, is at best an ineffective deposit control additive in fuel compositions.

The hydrocarbylpoly(oxyalkylene) aminocarbamate finding use within the scope of the present invention is characterized by having at least about one basic nitrogen atom per molecule. Since, within the compositional mixture, the amine moiety may contain more or less nitrogen, and consequently the poly(oxyalkylene) moiety of the carbamate may contain more than one poly(oxyalkylene) polymer, the aminocarbamate is further characterized by having, on the average, at least one basic nitrogen atom per aminocarbamate molecule. A "basic nitrogen atom" is one that is titratable by a strong acid, e.g., a primary, secondary or tertiary amino nitrogen, as distinguished from, for example, amido nitrogens,

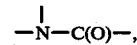

which are not so titratable. Preferably, at least one of the basic nitrogen atoms is in a primary or secondary amino group.

The preferred hydrocarbylpoly(oxyalkylene) aminocarbamate has a molecular weight of from about 600 to about 10,000 (representing an average maximum disubstitution of poly(oxyalkylene) polymer in the carbamate) and more preferably from about 1,200 to about 5,000.

A class of preferred carbamates may be described by the following general formula:

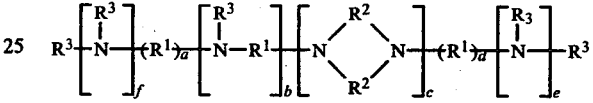

wherein two $R^3$ groups attached to the same nitrogen atom may form a 5 or 6 membered saturated or unsaturated nitrogen heterocyclic radical, such as pyrrolyl, pyrrolidinyl, imidazolidinyl, oxazolidinyl, pyrrolinyl, imidazolinyl, piperidino, piperazinyl, isoxazolyl, hexahydrotriazinyl, triazinyl, morpholino, etc.; wherein said heterocyclic radical may be substituted with substituents selected from the aforementioned (A), (B), (C) and (D) groups of substituents. The remaining $R^3$ groups are the same or different substituents selected from the aforementioned (A), (B), (C) and (D) groups of substituents and a poly(oxyalkylene) oxycarbonyl group of the formula $R-(OC_gH_{2g})_jO-C(O)-$ in which g is an integer of 2 to 5; j is an integer such that the molecular weight of the poly(oxyalkylene) group is from about 500 to about 5,000, i.e., j is at least about 5 and preferably from 8 to about 100, and R is a hydrocarbyl group of from 1 to 30 carbon atoms. $R^1$ is the same or different alkylene, carbonyl, oxycarbonyl, or hydroxy-substituted alkylene radical of from 2 to 6 carbon atoms, $R^2$ is carbonyl, alkylene carbonyl or alkylene of from 2 to 4 carbon atoms with vicinal linkages. At least one, and preferably no more than one, of the $R^3$ groups is the poly(oxyalkylene) oxycarbonyl group, and a sufficient number of the oxyalkylene units, $-OC_gH_{2g}-$, are branched $C_3-C_5$ oxyalkylene units to render the compound soluble in the fuel composition. $R^3$, $R^1$ and $R^2$ are selected such that at least one nitrogen atom is a basic nitrogen atom, i.e., titratable with strong aid. a is 0 or 1, preferably 1; b is an integer from 0 to 4, preferably 0 to 2; c is 0 or 1, preferably 0; d is 0 or 1, preferably 0; e is 0 or 1, preferably 1; and f is 0 or 1, and equal to 1 when c is 0. It is also provided that the sum of $f+b+2c+e$ is equal to or greater than 2.

Preparation of the Poly(oxyalkylene) Amino Carbamates

The additives of this invention may be most conveniently prepared, as has been previously noted, by reaction of phosgene with the monohydroxy poly(oxyalkylene) compound followed by reaction of the product with a suitable amine.

Bis(aminocarbamates), which we have made by reacting phosgene with an "uncapped" poly(oxyalkylene) diol followed by reaction with polyamine, have been found to have no deposit control activity; in fact, they may contribute significantly to valve deposits.

The reaction of the poly(oxyalkylene) compound and phosgene is usually carried out on an essentially equimolar basis, although excess phosgene can be used to improve the degree of reaction. Of course, excess phosgene is stripped from the product chloroformate before reaction with polyamine. The reaction may be carried out at temperatures from $-10°$ to $100°$ C., preferably in the range of $0°$ to $50°$ C. The reaction will usually be complete within $\frac{1}{4}$ to 5 hours. Times of reaction will usually be in the range of from 2 to 4 hours.

A solvent may be used in the chloroformylation reaction. Suitable solvents include benzene, toluene, etc.

The reaction of the resultant chloroformate with the amine may be carried out neat or preferably in solution. Temperatures of from $-10°$ to $200°$ C. may be utilized. The desired product may be obtained by water wash and stripping, usually by the aid of vacuum, of any residual solvent.

The mol ratio of the basic amine nitrogen to polyether chloroformate will generally be in the range from about 2 to 20 mols of basic amine nitrogen per mol of chloroformate, and more usually 5 to 15 mols of basic amine nitrogen per mol of chloroformate. The mol ratio will depend upon the particular amine and the desired ratio of polyether to amine. Since suppression of polysubstitution of the alkylene polyamines is usually desired, large mol excesses of the amine will be used. For example, preparation of the aminocarbamate from ethylenediamine with an ethylenediamine to chloroformate mol ratio of 2.5 to 1 has yielded a basic nitrogen to total nitrogen ratio in the product of 0.27, whereas raising the basic amine nitrogen to chloroformate ratio of 9.1 to 1 gives 0.42 basic nitrogen to total nitrogen ratio, showing a much higher amount of monocarbamate in the material.

The reaction or reactions may be conducted with or without the presence of a reaction solvent. A reaction solvent is generally employed whenever necessary to reduce the viscosity of the reaction product. These solvents should be stable and inert to the reactants and reaction product. Preferred solvents include aliphatic or aromatic hydrocarbons or aliphatic alcohols. Depending on the temperature of the reaction, the particular chloroformate used, the mol ratios and the particular amine, as well as the reactant concentrations, the reaction time may vary from less than 1 minute to 3 hours.

After the reaction has been carried out for a sufficient length of time, the reaction mixture may be subjected to extraction with a hydrocarbon-water or hydrocarbon-alcohol-water medium to free the product from any low-molecular-weight amine salts which have formed and any unreacted alkylene polyamines. The product may then be isolated by evaporation of the solvent. Small amounts of halogen may be present as the hydrohalide salt of the polyether aminocarbamates.

Depending on the particular application of the composition of this invention, the reaction may be carried out in the medium in which it will ultimately find use, e.g. polyether carriers or an oleophilic organic solvent or mixtures thereof and be formed at concentrations which provide a concentrate of a detergent composition. Thus, the final mixture may be in a form to be used directly for blending in fuels.

Although the fuel additive of the present invention has been described in terms of amine and poly(oxyalkylene) components coupled via a chloroformylation reaction utilizing phosgene, as is known to those of skill in the art, there are other methods of preparing carbamates which use other reactants. For example, the reaction of an isocyanate with an alcohol such as the hydroxycarbylpoly(oxyalkylene) alcohol described above also produces a carbamate. Monoisocyanato amines are produced, for example, by the methods of U.S. Pat. No. 3,644,490. Consequently, it is, for example, within the skill of the art to use a selected isocyanate-substituted amine or polyamine to react directly with said poly(oxyalkylene) alcohol to produce a carbamate within the scope of the present invention. This route may be exemplified by the reaction of $(CH_3)_2NCH_2CH_2N\!=\!C\!=\!O$ with a hydrocarbylpoly(oxyalkylene) alcohol to produce a carbamate characteristic of the present invention.

Fuel Compositions

The polyether aminocarbamates will generally be employed in a hydrocarbon distillate fuel. The proper concentration of additive necessary in order to achieve the desired detergency and dispersancy varies depending upon the type of fuel employed, the presence of other detergents, dispersants and other additives, etc. Generally, however, from 30 to 2000 weight parts per million, preferably from 100 to 500 ppm of polyetheraminocarbamate per part of base fuel is needed to achieve the best results. When other detergents are present, a lesser amount of polyether aminocarbamate may be used. For performance as a carburetor detergent only, lower concentrations, for example 30 to 70 parts per million may be preferred.

The deposit control additive may be formulated as a concentrate, using an inert stable oleophilic organic solvent boiling in the range of about $150°$ to $400°$ F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the additive will be ordinarily at least 10 percent by weight and generally not exceed 70 percent by weight, preferably 10–50 weight percent and most preferably from 10 to 25 weight percent.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as aryl halides, e.g., dichlorobenzene or alkyl halides, e.g., ethylene dibromide. Additionally, antioxidants, metal deactivators and demulsifiers may be present.

A particularly useful additive is a fuel-soluble carrier oil. Exemplary carrier oils include nonvolatile poly(oxyalkylene) compounds; other synthetic lubricants or lubricating mineral oil. Preferred carrier oils are poly(oxyalkylene) alcohols, diols (glycols) and polyols used singly or in mixtures, such as the Pluronics marketed by BASF Wyandotte Corp., and the UCON LB-series fluids marketed by Union Carbide Corp. When used, these carrier oils are believed to act as a carrier for the detergent and assist in removing and retarding deposits. They have been found to display synergistic effects when combined with certain hydrocarboxypoly(oxyalkylene) aminocarbamates. They are employed in amounts from about 0.005 to 0.5 percent by volume, based on the final gasoline composition. Preferably 100–5000 ppm by weight of a fuel soluble poly(oxyalkylene) alcohol, glycol or polyol is used as carrier oil. In the previously described concentrate the poly(oxyalkylene) alcohol, diols (glycols) and polyols are usually present in amounts of from 5 to 80 percent by weight. A particularly preferred poly(oxalkylene) carrier oil is poly(oxypropylene) alcohol, glycol or polyol, especially the alcohol, e.g., a ($C_1$-$C_{10}$ hydrocarbyl)poly(oxypropylene) alcohol.

EXEMPLIFICATION

The following examples are presented to illustrate specific embodiments of the practice of this invention and should not be interpreted as limitations upon the scope of the invention.

EXAMPLE 1

Reaction of Phosgene With a Poly(oxypropylene) Alcohol

A 99 g (1.0 mol) portion of phosgene was condensed into 750 ml of toluene at 0° C. A 450 g (0.17 mol) portion of butylpoly(oxypropylene) alcohol, i.e., polypropoxylated butanol, having a molecular weight of about 2400 was added as a slow stream to the phosgene-toluene mixture over a period of ½ hour while maintaining the temperature at 0°–10° C. 200 ml of benzene were added. The temperature was raised to 80° C. and excess phosgene and benzene were distilled from the product. A small sample was taken; toluene was evaporated from it. Infrared analysis showed a strong chloroformate absorption at 1785 $cm^{-1}$.

EXAMPLE 2

Reaction of Poly(oxypropylene) Chloroformate with Amine

One half of the product from Example 1 (in toluene solution) was added at room temperature to 154 g (1.5 mols) of diethylenetriamine in 500 ml of toluene. Immediate precipitation of an amine hydrochloride occurred. The mixture was stirred for one-half hour, filtered and the toluene was removed under reduced pressure. The residue was dissolved in 1½ volumes of hot n-butanol and extracted three times with 100–200 ml of hot water. The butanol was removed by vacuum providing 200 g of a product which contained 1.17% nitrogen and 0.80% basic nitrogen by ASTM D-2896. Infrared analysis revealed a typical carbamate absorption at 1725 $cm^{-1}$. This product is designated Compound I.

EXAMPLE 3

Following the procedures of Examples 1 and 2, polyether carbamate amines were prepared from the same butyl-capped poly(oxypropylene) glycol and the following amines giving products having the designated percent nitrogen.

| Compound | Amine | Wt. % Nitrogen |
|---|---|---|
| II | triethylenetetramine | 1.46 |
| III | dimethylaminopropylamine | 1.07 |
| IV | hydroxyethylethylenediamine | 0.84 |

EXAMPLE 4

Following the procedure of Examples 1 and 2, but using a butyl-capped poly(oxypropylene) glycol, i.e., butylpoly(oxypropylene) alcohol of about 1800 molecular weight, the following carbamates were prepared.

| Compound | Amine | Wt. % Nitrogen |
|---|---|---|
| V | ethylenediamine | 0.83 |
| VI | diethylenetriamine | 1.36 |

A 35.4 g portion of Compound VI was chromatographed on a silica gel column (2" dia.×7"), eluting with 1 liter of ethyl acetate; ethyl acetate:methanol, 4:1, and ethyl acetate:methanol:isopropyl amine, 7:2:1. The first fraction, 13.8 g, was found by infrared to be predominantly unreacted poly(oxypropylene). The latter two fractions, 20.7 g, were identified by the infrared carbonyl absorption as the desired carbamate. This material was designated VIa.

EXAMPLE 5

Reaction of Phosgene with Butylpoly(oxypropylene) Alcohol

Phosgene (27 ml, 37.5 g, 379 mmols) was condensed into an ice trap, and was then transferred to a 2 l, 3-neck flask containing toluene (500 ml) at −10° C. The flask was equipped with a gas inlet, mechanical stirrer, addition funnel and gas outlet leading to a caustic trap. Poly(propylene glycol) monobutyl ether, i.e., butylpoly(oxypropylene) alcohol, mw 1800 (500 g, 276 mmols) was then added over about 1 hour. After addition was complete, the mixture was stirred an additional half-hour at room temperature and then sat overnight under a nitrogen blanket. A small sample of the product was stripped of toluene under reduced pressure and showed a strong infrared absorption at 1785 $cm^{-1}$, indicating formation of the chloroformate.

One half of the above product (138 mmols) was added with stirring to diethylenetriamine (138 g, 1340 mmols) in toluene (150 ml). The reaction was exothermic, the temperature rising to 42° C. White amine hydrochloride salts precipitated immediately. The mixture was stirred 2 hours, stripped of toluene, diluted with 3 volumes of n-butanol, and washed four times with hot water (80° C., 200 ml). The organic phase was stripped of n-butanol under reduced pressure to yield 240 g of the carbamate as a colorless oil. % Nitrogen=1.42% or 64% of theory based on 1900 mw. The product exhibited a strong infrared absorption at 1725 $cm^{-1}$, and the 1785 $cm^{-1}$ band was gone.

EXAMPLE 6

Preparation of Alkylphenylpoly(oxybutylene) Alcohol

The experiment was carried out in dry glassware under an inert atmosphere. Potassium (1.17 g, 0.03 mol) was added to 26.34 g (0.1 mol) of a phenol alkylated with propylene tetramer. The mixture was stirred and heated to 50° C. for 24 hours until the potassium dissolved. The pot temperature was raised to 80° C. and 1,2-epoxybutane (215 ml, 2.5 mols) was added at a rate slow enough to prevent flooding of the condenser. The reaction was stirred and heated at reflux until the pot temperature reached 125° C. The product was extracted into 2 volumes of diethyl ether and washed with two volumes of 0.5 N HCl. Diethyl ether (250 ml) was added to the ethereal layer, and it was washed four times with 250-ml aliquots of water. The solvent was removed and the product was azeotroped with toluene to remove traces of water. A yield of 145 g of a viscous liquid of molecular weight approximately 1500 was obtained.

EXAMPLE 7

Reaction of Alkylphenylpoly(oxybutylene) Alcohol with Phosgene

Phosgene (14 ml, 0.198 mol) was condensed and transferred to a flask containing 150 ml of toluene. This mixture was cooled and stirred in an ice bath while the alkylphenyl-terminated polyether glycol of Example 6 (140 g, 0.09 mol) was added dropwise. After the addition was complete, the ice bath was removed and the mixture was stirred for about 1 hour. An aliquot was taken, and the infra-red spectrum of its non-volatile residue showed a strong chloroformate absorption at 1785 cm$^{-1}$.

EXAMPLE 8

Reaction of Alkylphenylpoly(oxybutylene) Chloroformate with Amine

Ethylenediamine (41 ml, 0.61 mol) was stirred rapidly and cooled in an ice bath. The chloroformate of Example 7 was diluted with four volumes of toluene and added to the ethylenediamine at such a rate that the pot temperature did not exceed 30° C. After the addition was completed, the ice bath was removed and the mixture was stirred for about 1 hour.

The mixture was extracted into 500-ml of hot n-butanol and washed four times with 500-ml aliquots of hot water. The solvent was removed and the product was azeotroped with toluene to remove traces of water, giving 125 g of a viscous amber liquid of molecular weight about 1600. The product contained 1.20% by weight nitrogen and dispersed sludge at 200–400 ppm.

EXAMPLE 9

Preparation of Poly(oxypropylene)-Poly(oxybutylene) Aminocarbamates

The procedures used for the polymerization of 1,2-epoxybutane was the same as that employed in Example 6, except that a butyl-terminated poly(oxypropylene) alcohol of molecular weight about 800, UCON LB165, was used in place of the alkyl phenol as an initiator for the polymerization of 1,2-epoxybutane. The preparation of the chloroformate and aminocarbamate of ethylene diamine were also similar to the preceding examples. The product, an amber liquid of molecular weight about 1800, contained 1.52% by weight nitrogen.

EXAMPLE 10

Preparation of Aminocarbamates from Cyclic Amines

In a manner similar to that described above, poly(oxypropylene) aminocarbamates were prepared from amines having the following structures:

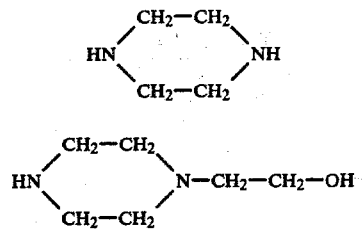

EVALUATION

In the following tests the polyether aminocarbamates were blended in gasoline and their deposit control capacity tested in an ASTM/CFR Single-Cylinder Engine Test.

In carrying out the tests, a Waukesha CFR single-cylinder engine is used. The run is carried out for 15 hours, at the end of which time the intake valve is removed, washed with hexane and weighed. The previously determined weight of the clean valve is substracted from the weight of the valve. The differences between the two weights is the weight of the deposit with a lesser amount of deposit measured connoting a superior additive. The operating conditions of the test are as follows: water jacket temperature 100° C. (212° F.); manifold vacuum of 12 in Hg, intake mixture temperature of 50.2° C. (125° F.); air-fuel ratio of 12; ignition spark timing of 40° BTC; engine speed is 1800 rpm; the crankcase oil is a commercial 30W oil. The amount of carbonaceous deposit in milligrams on the intake valves is measured and reported in the following Table I.

The base fuel tested in the above test is a regular octane unleaded gasoline containing no fuel deposit control additive. The base fuel is admixed with varying amounts of the deposit control additives (in Table I and subsequent Tables, the additives are identified by Roman numeral compound numbers from the foregoing and following Examples).

TABLE I

| Additive Carrier Description | ppm | Intake Valve Deposit Tests[1] Average Washed Deposit, mg | |
|---|---|---|---|
| | | 11A Engine | 12A Engine |
| Base Fuel | — | 259[2] | 102[3] |
| IV | 200 | 24 | 27 |
| PPG-1450[4] | 300 | | |
| V | 333 | 12 | 6 |
| PPG-1800[5] | 167 | | |
| V | 200 | 33 | 18 |
| PPG-1450[4] | 300 | | |
| VI | 500 | 6 | 15 |
| VIa | 125 | 14 | 45 |
| PPG-1800[5] | 375 | | |
| VIa | 125 | 16 | 23 |
| PPG-1450[4] | 275 | | |

[1] Single evaluations unless noted.
[2] Average of 8 runs.
[3] Average of 4 runs.
[4] The designation PPG-1450 refers to a monobutyl-capped poly-(propylene glycol) of about 1450 molecular weight.
[5] Same as footnote 4, but about 1800 molecular weight.

The above results show the significant reduction in valve deposits achieved compared with base fuel.

In order to show the effect of addition of a poly(oxyalkylene) carrier on deposits, 12A Engine Deposit Tests were performed as above using various combinations of Additive VI and PPG-1450 (see description in footnote 4 above). These results are set forth in Table IA.

TABLE IA

Intake Valve Deposit Tests on Combinations of Poly (oxyalkylene) Aminocarbamate and Poly (oxyalkylene) Glycol

| Run | Total Additive, ppm | VIa, ppm | PPG-1450, ppm | Average Washed Deposits, ppm |
|---|---|---|---|---|
| 1 | 0 | 0 | 0 | 103 |
| 2 | 250 | 50 | 200 | 144 |
| 3 | 250 | 100 | 150 | 6 |
| 4 | 250 | 125 | 125 | 64,12 |
| 5 | 250 | 150 | 100 | 16 |
| 6 | 250 | 250 | 0 | 114 |
| 7 | 200 | 100 | 100 | 52 |
| 8 | 200 | 200 | 0 | 230 |

These results show that the poly(oxyalkylene) glycol functions as more than a conventional carrier. For example, Runs 3, 4 and 5 containing equal total quantities of glycol and carbamate were much more effective than the carbamate alone of Run 6 or the predominantly glycol mixture of Run 2.

The additives were evaluated in a laboratory dispersancy test. The hexane-insoluble, chloroform-soluble portion of sludge scraped from the crankcase of high mileage engines was added as a chloroform solution to a typical base gasoline containing varying amounts of the test additive. The concentration of additive necessary to prevent coagulation and precipitation of the sludge for at least 30 minutes was measured.

Table II sets forth these results:

TABLE II

| Example | Compound No. | Conc., ppm |
|---|---|---|
| 2 | I | 150 |
| 3 | II | 150 |
| 3 | III | 200 |
| 3 | IV | 150 |
| 4 | V | 300 |
| 4 | VI | 150 |

The above data indicate that all of these additives are effective dispersants.

In order to compare the compounds of this invention with compounds prepared from poly(oxyalkylene) glycols, i.e., polyether diols, bis-aminocarbamates were prepared as follows:

EXAMPLE 11

Preparation of Poly(oxybutylene) Glycol 25 g (278 mmol) of 2,3-butanediol and 100 ml of toluene were placed in a 1-liter, 3-necked flask equipped with a Dean-Stark trap, reflux condenser, mechanical stirrer and a nitrogen inlet. The mixture was heated under reflux to remove trace water in the diol. After cooling, 3.25 g (80 meq) of potassium was added and the mixture was stirred until the potassium dissolved. The trap was removed and an addition funnel attached. 500 g (6.94 mol) of 1,2-butylene oxide was added slowly and the mixture was heated to reflux until the overhead temperature reached 119° C. (37 hours).

200 ml of an acidic ion-exchange resin (Bio-Rad 50W-X2) was added to the mixture and it was stirred for 1.5 hours. 200 ml of toluene was added to the mixture and water was removed by azeotropic distillation. The product was filtered to remove the resin, and the solvent was removed under reduced pressure. The resulting diol (482 g) had a hydroxyl number of 67 mg KOH/g.

EXAMPLE 12

Preparation of Poly(butylene Glycol) Chloroformate 200 g of poly(oxybutylene) glycol (product of Example 11) was added to phosgene (66 g) in 150 ml of toluene at 0° C. The mixture was stirred for 2 hours at 0° C. and for 2 hours at 25° C. Excess phosgene was then removed by distillation. The resulting di(chloroformate) contained 7.74% chlorine (95% of theoretical) based on the hydroxyl number of the starting diol.

EXAMPLE 13

Preparation of Bis(N-aminoethylcarbamate) of Poly(butylene Glycol)

A 180-g portion of the product of Example 12 was diluted with toluene to form a 50% weight solution. Pumps were employed to meter the chloroformate solution (8 volumes) and ethylenediamine (1 volume) to a Komax Static mixing tube at a combined flow rate of 1200 ml/min. The resulting crude carbamate was purified by diluting with an equal volume of 1-butanol and washing with water (four 1000-ml portions) until the wash pH was 7. The butanol was removed under reduced pressure. The product contained 2.45% nitrogen (81% of theory based upon the chlorine content of the chloroformate). The compound (designated "Compound VIII") was found to have no dispersancy in the dispersancy test.

ASTM/CFR Single-Cylinder Engine Tests as described above were performed on a series of additives formulated by combining the bis compound (VIII) of Example 13 with a poly(oxybutylene) aminocarbamate of ethylene diamine (Compound IX) (i.e., alkylphenyl-poly(oxyisobutylene)-N-(2-aminoethyl)carbamate) in which the poly(oxybutylene) is capped with an alkylphenyl group. The molecular weight of the capped polymer was 1475. The compound was prepared in essentially the same manner as Example 2. Table IB sets forth these data.

TABLE IB

Intake Valve Deposit Tests on Combinations of Poly (oxybutylene) Amino-Carbamates and Poly (oxybutylene) Bis (aminocarbamates)

| Run | Total Additive, ppm | IX, ppm | VIII, ppm | Average washed Deposits, mg. | |
|---|---|---|---|---|---|
| | | | | 11a Engine | 12a Engine |
| 1 | 0 | 0 | 0 | 127[1] | 162[1] |
| 2 | 300 | 300 | 0 | 26[2] | 10[2] |
| 3 | 320 | 300 | 20 | 62 | 26 |
| 4 | 340 | 300 | 40 | 180[2] | 65[2] |
| 5 | 375 | 300 | 75 | 117[2] | 76 |
| 6 | 300 | 0 | 300 | 643 | 653 |

[1]Average of 8 runs
[2]Average of 2 runs

These data show that the bis(aminocarbamates) may be severely detrimental to deposit control characteristics in fuels.

A laboratory engine test was used to evaluate the tendency of the additives to contribute to ORI. The test engine is a CLR single-cylinder, balanced, high-speed, four-cycle engine designed primarily for oil test and research work. It is manufactured by the Laboratory Equipment Corporation of Mooresville, Ind. The major engine dimensions are:

| | |
|---|---|
| Bore | 3.80 In. |
| Stroke | 3.75 in. |
| Displacement | 42.5 Cu. In. |
| Compression Ratio | 8:1 |

The carburetor, intake manifold, and distributor were slightly modified to facilitate the test procedure. These modifications were made in order to make the engine's ORI characteristics comparable to modern-day automobiles.

The test procedure involves engine operation for 80 hours (24 hours a day) on a prescribed load and speed schedule representative of typical vehicle driving conditions. The cycle for engine operation during the test is as follows:

TABLE III
Deposit Accumulation Cycle CIR Single Cylinder

| | Mode | Time in Mode, Sec. | Manifold Vacuum, In. Hg | Engine Speed, rpm |
|---|---|---|---|---|
| 1. | Idle | 140 | 16 | 900 |
| 2. | Heavy Cruise, Low Speed | 70 | 7 | 2000 |
| 3. | Light Cruise, Low Speed | 140 | 13 | 2000 |
| 4. | Deceleration | 140 | 18 | 1800 |
| 5. | Heavy Cruise, Low Speed | 70 | 7 | 2000 |
| 6. | Light Cruise, Low Speed | 140 | 13 | 2000 |
| 7. | Idle | 210 | 16 | 900 |
| 8. | Heavy Cruise, Low Speed | 70 | 7 | 2000 |
| 9. | Light Cruise, Low Speed | 70 | 13 | 2000 |
| 10. | Heavy Cruise, High Speed | 70 | 9 | 2500 |
| 11. | Light Cruise, High Speed | 140 | 15 | 2500 |
| 12. | Deceleration | 140 | 18 | 1800 |

All of the test runs were made with the same base gasoline, which was representative of commercial unleaded fuel. The results are set forth in Table IV.

TABLE IV
Laboratory ORI Test Results

| Run | Additive, Carrier Description | Concentration, ppm | Combustion Chamber Deposits, g | ORI |
|---|---|---|---|---|
| 159 | — | None | xx | 3.4 |
| 161 | Commercially available nitrogen-containing deposit control additive | 467 | xx | 7.1 |
| | Mineral carrier oil | 1600 | | |
| 163 | — | None | 1.2 | 2.4 |
| 164 | VI (from Example 4) | 500 | 1.6 | 4.2 |
| 165 | Deposit control additive (Same as 161) | 300 | 2.1 | 5.5 |
| | Mineral oil carrier (Same as 161) | 1000 | | |
| 167* | VI (from Example 4) | 500 | 1.6 | 5.8 |
| 168 | — | None | 1.4 | 3.6 |
| 169 | V (from Example 4) PPG-1450** | 286 214 | 1.3 | 2.5 |
| 170 | V (from Example 4) PPG-1450** | 286 214 | 1.6 | 2.4 |

*Air-fuel ratio during the idle portions of the test cycle was off specification during Run 167.
**See Table I, footnote 4
xx Not measured.

Simple arithmetic averages of the results indicate: base fuel (Runs 159, 163 and 168) an ORI of 3.1 and combustion chamber deposits weighing 1.3 g, the commercial additives averaged 6.3 units ORI and had combustion chamber deposits weighing 2.1 g, and the polyether aminocarbamates gave an ORI of 3.7 (3.0 omitting Run 167, see Table IV, first footnote); and combustion chamber deposits averaging 1.5 g. These results indicate that the polyether aminocarbamates, which have been demonstrated to be excellent inlet system deposit control additives, do not contribute significantly to increasing octane requirements of the engines in which they are employed. The fuel compositions containing those additives find excellent service in modern engines, maintaining excellent fuel consumption at lower octane levels.

The test for evaluating the ability of fuel additives to control carburetor deposits employs a 1973 model year, 240 CID, 6-cylinder Ford engine. The internal bore of the carburetor throttle body is equipped with a thin, removable aluminum sleeve. The difference between sleeve weights determined before and after an engine run represents the change in amount of surface deposit occurring during that run.

For additive evaluation, two test phases are run as set forth in Table V.

TABLE V
Carburetor Deposit Test Procedure

1. Dirty-Up Phase (Starting with Clean Sleeve)

| | |
|---|---|
| Objective: | Establish deposits on carburetor sleeve. |
| Duration: | 15 hours. |
| Operating Cycle: | 7 minutes moderate load and speed, 4 minutes idle. |
| Engine Setup: | Crankcase blowby gases routed to carburetor air inlet. |
| Fuel: | Deposit-forming fuel containing heavy FCC component. |
| Evaluation: | Sleeve weights are determined at the beginning and end of the dirty-up phase, and sleeve deposits are rated visually on a scale of 0 to 10 (10 = clean). |

2. Cleanup Phase (Begins with Sleeve Deposits Formed During Dirty-Up Phase)

| | |
|---|---|
| Objective: | Measure additive performance in cleaning up deposits. |
| Duration: | 4 hours. |
| Operating Cycle: | Same as dirty-up phase |
| Engine Setup: | Crankcase blowby cases diverted from carburetor inlet - EGR shutoff. |
| Fuel: | Commercial-type gasoline containing additive under test. |
| Evaluation: | The sleeve is reweighed and rerated visually. Differences between initial and final values represent additive effectiveness. |

Table VI presents average values for the performance of PPG-aminocarbamate additives. Also, presented are values for a commercial deposit control additive having recognized performance in the field. Deposit level changes with a commercial-type unleaded gasoline without additive are also shown. In Table VI, EDA refers to ethylenediamine and DETA refers to diethylenetriamine.

TABLE VI
Carburetor Test Results

| | | | Average Additive Performance | | | |
|---|---|---|---|---|---|---|
| | Runs | Concentration, ppm | Deposit Weight Reduction, % | Initial | | Final | (A) |
| PPG-625 EDA Carbamate[2] | 4 | 200 | 88 | 4.9[4] | → | 8.1[4] | 3.2[4] |
| PPG-625 DETA Carbamate[3] | 1 | 150 | 93 | 4.4 | → | 8.1 | 3.7 |
| Commercial deposit control Additive | 8 | 150 | 91 | 5.3 | → | 8.4 | 3.1 |

TABLE VI-continued

| | Runs | Concentration, ppm | Deposit Weight Reduction, % | Initial | Final | (A) |
|---|---|---|---|---|---|---|
| | | | Carburetor Test Results | | | |
| | | | Average Additive Performance | | | |
| None | 2 | — | 63 | 4.6 | → 6.0 | 1.4 |

(A) Deposit weight reduction
[1]Visual Deposit rating (10=clean on a scale of 0 to 10).
[2]Similar to Compound V of Example 4.
[3]Similar to Compound VI of Example 4.
[4]Data for 3 runs only.

These data show that the polyether aminocarbamates are as effective carburetor deposit control additives as the recognized commercial additive.

The three additives tested gave carburetor deposit weight reductions ranging from 85%–95% and improvements in visual deposit ratings from initial levels of 5 to final levels as high as 9 on a scale of 1 to 10.

Although many specific embodiments of the invention have been described in detail, it should be understood that the invention is to be given the broadest possible interpretation within the terms of the following claims.

What is claimed is:

1. A fuel composition comprising a major portion of hydrocarbons boiling in the gasoline range, and from 30 to 2,000 ppm of a hydrocarbylpoly(oxyalkylene) aminocarbamate of molecular weight from about 600 to 10,000, and having at least one basic nitrogen atom; wherein said hydrocarbylpoly(oxyalkylene) moiety is composed of oxyalkylene units selected from 2 to 5 carbon oxyalkylene units of which at least a sufficient number are branched chain oxyalkylene units to render said carbamate soluble in said fuel composition; and said hydrocarbyl group contains from 1 to about 30 carbon atoms.

2. The fuel composition of claim 1 in which at least one basic nitrogen atom in said aminocarbamate is in a primary or secondary amino group.

3. The fuel composition of claim 1 in which said hydrocarbylpoly(oxyalkylene) moiety consists of 1 to 2 hydrocarbylpoly)oxyalkylene) polymers.

4. The fuel composition of claim 3 in which each said oxyalkylene units contains 3 to 4 carbon atoms.

5. The fuel composition of claim 4 in which said oxyalkylene units are oxybutylene.

6. The fuel compostion of claim 1 in which said hydrocarbylpoly(oxyalkylene) moiety has a molecular weight of from about 500 to 5,000.

7. The fuel composition of claim 1 in which said aminocarbamate has a molecular weight of about 1,200 to 5,000.

8. The fuel composition of claim 1 in which said hydrocarbyl group contains from 2 to about 20 carbon atoms.

9. The fuel composition of claim 1 in which said hydrocarbyl group is an alkylphenyl group.

10. The fuel composition of claim 9 in which the alkyl in said alkylphenyl group is propylene tetramer.

11. The fuel composition of claim 1 wherein the amine moiety of said aminocarbamate is derived from a polyamine having from 2 to 12 amine nitrogen atoms and from 2 to 40 carbon atoms with a carbon:nitrogen ratio between 1:1 and 10:1.

12. The fuel composition of claim 11 in which said polyamine is a substituted polyamine with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C).

13. The fuel composition of claim 11 in which said polyamine is a polyalkylene polyamine wherein the alkylene group contains from 2 to 6 carbon atoms and the polyamine contains 2 to 12 amine nitrogen atoms and 2 to 24 carbon atoms.

14. The fuel composition of claim 13 in which said polyalkylene polyamine is selected from the group consisting of ethylene diamine, polyethylene polyamine, propylene diamine and polypropylene polyamine.

15. The fuel composition of claim 11 in which said polyamine is ethylene diamine.

16. The fuel composition of claim 1 in which said hydrocarbylpoly(oxyalkylene) aminocarbamate is butylpoly(oxypropylene)-N-(2-aminoethyl)carbamate.

17. The fuel composition of claim 1 in which said hydrocarbylpoly(oxyalkylene) aminocarbamate is alkylphenylpoly(oxyisobutylene)-N-(2-aminoethyl)carbamate.

18. A fuel composition comprising a major portion of hydrocarbons boiling in the gasoline range and from 30 to 2000 ppm of a poly(oxyalkylene) aminocarbamate having at least one $C_1$–$C_{30}$ hydrocarbyl-terminated poly(oxyalkylene) chain comprising 2 to 5 carbon oxyalkylene units bonded through an oxycarbonyl group to a nitrogen atom of a polyamine; said polyamine having from 2 to 12 amine nitrogens and from 2 to 40 carbon atoms with a carbon:nitrogen ratio between 1:1 and 10:1, said poly(oxyalkylene) aminocarbamate having a molecular weight of from about 600 to 10,000, the polyamine moiety containing at least one basic nitrogen atom, the polyoxyalkylene) chain containing at least a sufficient number of branched $C_3$–$C_5$ oxyalkylene units to render the aminocarbamate soluble in said fuel composition.

19. The composition of claim 18 wherein at least one basic nitrogen atom in said aminocarbamate is in a primary or secondary amino group.

20. The composition of claim 18 wherein the oxyalkylene units contain 3 or 4 carbon atoms.

21. The composition of claim 18 wherein the molecular weight is from about 1200 to 5,000, and the polyamine is a polyalkylene polyamine.

22. The composition of claim 18 wherein the hydrocarbyl group is an alkylphenyl group or a butyl group.

23. A fuel composition comprising a major portion of hydrocarbons boiling in the gasoline range and from 30 to 2000 ppm of a compound of the formula:

$$R^3 {-} N {-} \left[{-}(R^1)_a{-}N{-}R^1{-}\right]_b \left[{-}N \begin{array}{c} R^2 \\ \diagup \\ \diagdown \\ R^2 \end{array} N {-}\right]_c \left[{-}(R^1)_a{-}N{-}\right]_e R^3$$

wherein two $R^3$ groups attached to the same nitrogen atom and taken together with said nitrogen atom may form a 5 or 6 membered saturated or unsaturated nitrogen heterocyclic radical; wherein said heterocyclic radical may be substituted with substituents selected from: (A) hydrogen; (B) hydrocarbyl groups of from 1 to 10 carbon atoms; (C) acyl groups of from 2 to 10 carbon atoms; and (D) monoketo, monohydroxy, mononitro, monocyano, lower alkyl and lower alkoxy derivatives of the substituents of (B) and (C); wherein the remaining $R^3$ groups are the same or different substituents selected from (A), (B), (C), (D) and poly(oxyalkylene) oxycarbonyl groups of the formula R—$(OC_gH_{2g})_jO$—C(O)— in which g is an integer from 2 to 5; j is an integer such that the molecular weight of the poly(oxyalkylene) group is about 500 to 5,000, and R is a hydrocarbyl group of from 1 to 30 carbon atoms; wherein the $R^1$ are the same or different alkylene, carbonyl, oxycarbonyl, or hydroxy-substituted alkylene radical of from 2 to 6 carbon atoms, and $R^2$ is carbonyl, alkylene carbonyl or alkylene of 2 to 4 carbon atoms with vicinal linkages; wherein at least one of the $R^3$ groups is said poly(oxyalkylene) oxycarbonyl group in which a sufficient number of oxyalkylene units, —$OC_gH_{2g}$—, are branched chains $C_3$–$C_5$ oxyalkylene units to render said compound soluble in said fuel composition; wherein $R^3$, $R^1$ and $R^2$ are selected such that at least one nitrogen atom is a basic nitrogen atom; and wherein a is 0 or 1, b is an integer 0 to 4, c is 0 or 1, d is 0 or 1, e is 0 or 1, f is 0 or 1 and equal to 1 when c is 0, and the sum f+b+2c+e is equal to or greater than 2.

24. The composition of claim 23 in which g is 3 or 4.

25. The composition of claim 24 in which f, a, and e are each equal to 1 and c and d are each 0.

26. The composition of claim 25 in which all the $R^3$ groups other than the poly(oxyalkylene) group are H.

27. The composition of claim 26 in which $R^1$ is propylene.

28. The composition of claim 26 in which $R^1$ is ethylene.

29. The composition of claim 26 in which R is an alkylphenyl group.

30. The fuel composition of claim 1 which contains in addition from 100 to 5,000 ppm of a fuel-soluble poly(oxyalkylene) alcohol, glycol or polyol.

31. The fuel composition of claim 30 in which the poly(oxyalkylene) compound is poly(oxypropylene) alcohol.

32. A concentrate according to claim 1 wherein there is present in addition ($C_1$–$C_{30}$ hydrocarbyl) poly(oxyalkylene) alcohol in the amount of from 5 to 80 weight percent.

33. The fuel composition of claim 18 which contains in addition from 100 to 5,000 ppm of a fuel-soluble poly(oxyalkylene) alcohol, glycol or polyol.

34. The fuel composition of claim 33 in which the poly(oxyalkylene) compound is poly(oxypropylene) alcohol.

35. A concentrate according to claim 1 wherein there is present, in addition, ($C_1$–$C_{30}$ hydrocarbyl) poly(oxyalkylene) alcohol in the amount of from 5 to 80 weight percent.

36. The fuel composition of claim 23 which contains in addition from 100 to 5,000 ppm of a fuel-soluble poly(oxyalkylene) alcohol, glycol or polyol.

37. The fuel composition of claim 33 in which the poly(oxyalkylene) compound is poly(oxypropylene) alcohol.

38. A concentrate according to claim 1 wherein there is present, in addition, ($C_1$–$C_{30}$ hydrocarbyl) poly(oxyalkylene) alcohol in the amount of from 5 to 80 weight percent.

39. A concentrate of a deposit control additive for fuel compositions comprises an inert stable oleophilic organic solvent boiling in the range of from about 150° to 400° F. and from 10 to 50 weight percent of a hydrocarbyl poly(oxyalkylene) aminocarbamate of molecular weight from about 600 to 10,000, and having at least one basic nitrogen atom; wherein said hydrocarbyl poly(oxyalkylene) moiety is composed of oxyalkylene units selected from 2 to 5 carbon oxyalkylene units of which at least a sufficient number are branched chain oxyalkylene units to render said carbamate soluble in hydrocarbons boiling in the gasoline range; and said hydrocarbyl group contains from 1 to about 30 carbon atoms.

40. A concentrate of a deposit control additive for fuel compositions comprises an inert stable oleophilic organic solvent boiling in the range of about 150° F. to 400° F. and from 10 to 50 weight percent of a poly(oxyalkylene) aminocarbamate having at least one $C_1$–$C_{30}$ hydrocarbyl-terminated poly(oxyalkylene) chain comprising 2 to 5 carbon oxyalkylene units bonded through an oxycarbonyl group to a nitrogen atom of a polyamine; said polyamine having from 2 to 12 amine nitrogen atoms and from 2 to 40 carbon atoms with a carbon:nitrogen ratio between 1:1 and 10:1, said poly(oxyalkylene) aminocarbamate having a molecular weight of from about 600 to 10,000, the polyamine moiety containing at least one basic nitrogen atom, the poly(oxyalkylene) chain containing at least a sufficient number of branched $C_3$–$C_5$ oxyalkylene units to render the aminocarbamate soluble in hydrocarbons boiling in the gasoline range.

41. A concentrate of a deposit control additive for fuel compositions comprises an inert stable oleophilic organic solvent boiling in the range of about 150° F. to 400° F. and from 10 to 50 weight percent of a compound of the formula:

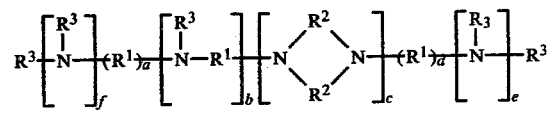

wherein two $R^3$ groups attached to the same nitrogen atom and taken together with said nitrogen atom may form a 5- or 6-membered saturated or unsaturated nitrogen heterocyclic radical; wherein said heterocyclic radical may be substituted with substituents selected from: (A) hydrogen; (B) hydrocarbyl groups of from 1 to 10 carbon atoms; (C) acyl groups of from 2 to 10 carbon atoms; and (D) monoketo, monohydroxy, mononitro, monocyano, lower alkyl and lower alkoxy derivatives of the substituents of (B) and (C); wherein the remaining $R^3$ groups are the same or different substituents selected from (A), (B), (C), (D) and poly(oxyalkylene) oxycarbonyl groups of the formula R—$OC_gH_{2g})_jO$—C(O)— in which g is an integer from 2 to 5; j is an integer such that the molecular weight of the poly(oxyalkylene) group is about 500 to 5,000, and R is a hydrocarbyl group of from 1 to 30 carbon atoms; wherein the $R^1$ are the same or different alkylene, carbonyl, oxycarbonyl, or hydroxy-substituted alkylene radical of from 2 to 6 carbon atoms, and $R^2$ is carbonyl, alkylene carbonyl or alkylene of 2 to 4 carbon atoms with vicinal linkages; wherein at least one of the $R^3$ groups is said poly(oxyalkylene) oxycarbonyl group in which a sufficient number of oxyalkylene units, —$OC_gH_{2g}$—, are branched chained $C_3$–$C_5$ oxyalkylene units to render said compound soluble in hydrocarbons boiling in the gasoline range; wherein $R^3$, $R^1$ and $R^2$ are selected such that at least one nitrogen atom is a basic nitrogen atom; and wherein a is 0 or 1, b is an integer 0 to 4, c is 0 or 1, d is 0 or 1, e is 0 or 1, f is 0 or 1 and equal to 1 when c is 0, and the sum f+b+2c+e is equal to or greater than 2.

* * * * *